April 12, 1966 M. M. BROWN, JR., ETAL 3,246,304

FUNCTION SELECTOR PROGRAMMER

Filed Jan. 9, 1962 4 Sheets-Sheet 1

INVENTORS
MALCOLM M. BROWN, JR.
ESTEL J. Mc KAMEY
BY H. H. Losche
ATTORNEYS.

INVENTORS
MALCOLM M. BROWN, JR.
ESTEL J. McKAMEY
BY H. H. Losche
ATTORNEYS.

April 12, 1966 M. M. BROWN, JR., ETAL 3,246,304

FUNCTION SELECTOR PROGRAMMER

Filed Jan. 9, 1962 4 Sheets-Sheet 3

INVENTORS
MALCOLM M. BROWN, JR.
ESTEL J. Mc KAMEY
BY
W. H. Losche
ATTORNEYS.

INVENTORS
MALCOLM M. BROWN, JR.
ESTEL J. Mc KAMEY
BY

ATTORNEYS.

United States Patent Office 3,246,304
Patented Apr. 12, 1966

3,246,304

FUNCTION SELECTOR PROGRAMMER

Malcolm M. Brown, Jr., Bedford, and Estel J. McKamey, Bloomington, Ind., assignors to the United States of America as represented by the Secretary of the Navy Filed Jan. 9, 1962, Ser. No. 165,263
5 Claims. (Cl. 340—172.5)

The invention described herein may be manufactured and used by or for the Government of the United States of America for governmental purposes without the payment of any royalties thereon or therefor.

The present invention is generally related to timed control systems and more particularly to programmed function selecting equipment for establishing and controlling a sequence of events with respect to time.

A need has long existed in the field of electronic component and equipment testing for a completely electronic control system capable of being programmed to select and apply sources of power to various circuits, devices, loads, etc., in a prearranged pattern for time intervals from fractions of milliseconds to minutes or longer for purposes of reliability testing, etc., of either the source of power or the various loads, or both. The present invention fulfills this need. Devices of the prior art for performing similar functions utilize mechanical cams, timing clocks, and/or electromechanical relays to accumulate the desired time base for controlling their function selecting circuitry. These devices of the prior art presently leave much to be desired since the shortest interval of time in which a function or load can be selected, applied and withdrawn is quite often too long to meet current testing requirements and specifications. Another disadvantage of most electromechanical programming systems is the great number of relays necessitated by such systems in their time accumulation circuitry in order that a useful range of time selection intervals may be provided. Such systems, utilizing large numbers of electromechanical relays, are undesirable not only from an initial cost standpoint, but also because of the extensive maintenance required to keep them in proper operating condition. The present invention overcomes these disadvantages of the prior art by utilizing novel and completely electronic control circuitry, therein providing a practically maintenance free programmable function selecting system.

The novel circuitry of the present invention utilizes a transistor oscillator as a time generator in conjunction with electronic decade counting tubes both for time accumulation functions and for circuit controlling and selecting functions, eliminating the need for a large number of expensive, relatively slow responding electromechanical relays. Various logic circuitry and switch-controlled programming means combine with the oscillator-counting tube circuitry to provide a very useful and efficient programmed function selecting device.

An object of the present invention is the provision of a time-controlled function selecting system.

Another object is to provide a programmable function selecting system.

A further object of the invention is the provision of an electronic device for selecting and initiating a sequence or program of events with respect to time.

Still another object is to provide a completely electronic, programmable function selecting system for testing electronic components and equipment.

Yet another object of the present invention is the provision of a relatively maintenance-free, electronic function selecting system for automatically controlling a plurality of functions or operations according to an established program with respect to time.

Other objects and many of the attendant advantages of this invention will be readily appreciated as the same becomes better understood by reference to the following detailed description when considered in connection with the accompanying drawings in which like reference numerals designate like parts throughout the various figures thereof, and wherein:

FIGURES 1*a* and 1*b*, when properly joined, form a block diagram of a preferred embodiment of the invention.

Figure 1A:
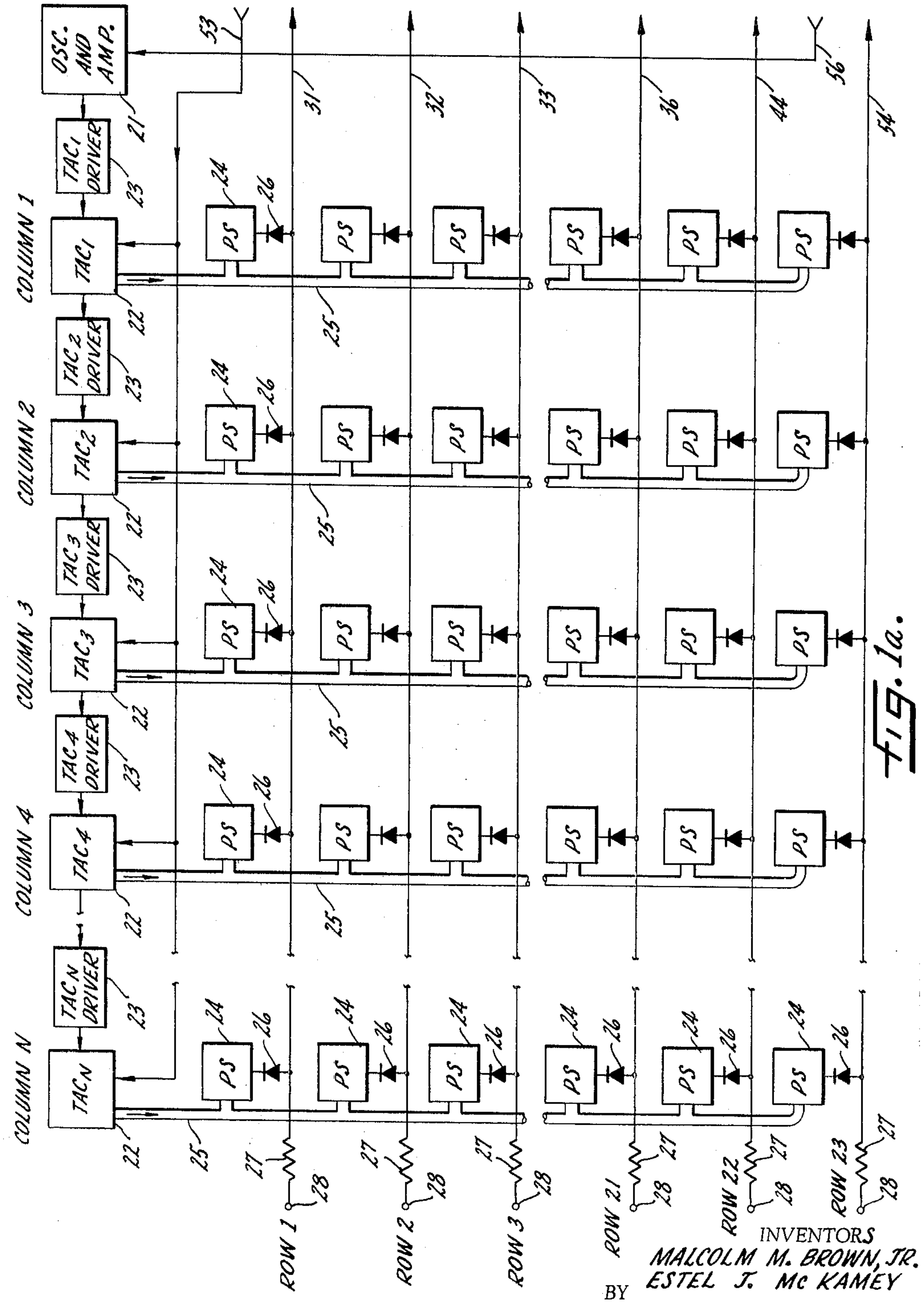
Figure 4:
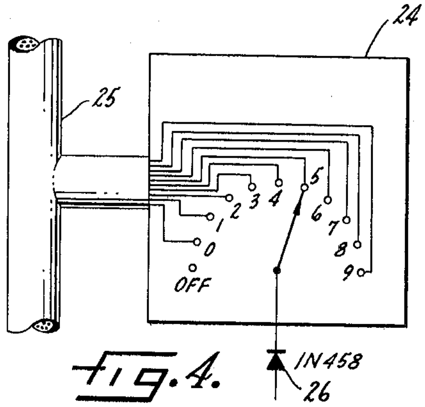

FIGURE 4 discloses a schematic diagram of a manually positionable switch means suitable for use in blocks 24 of FIGURE 1*a*.

Figure 1B:
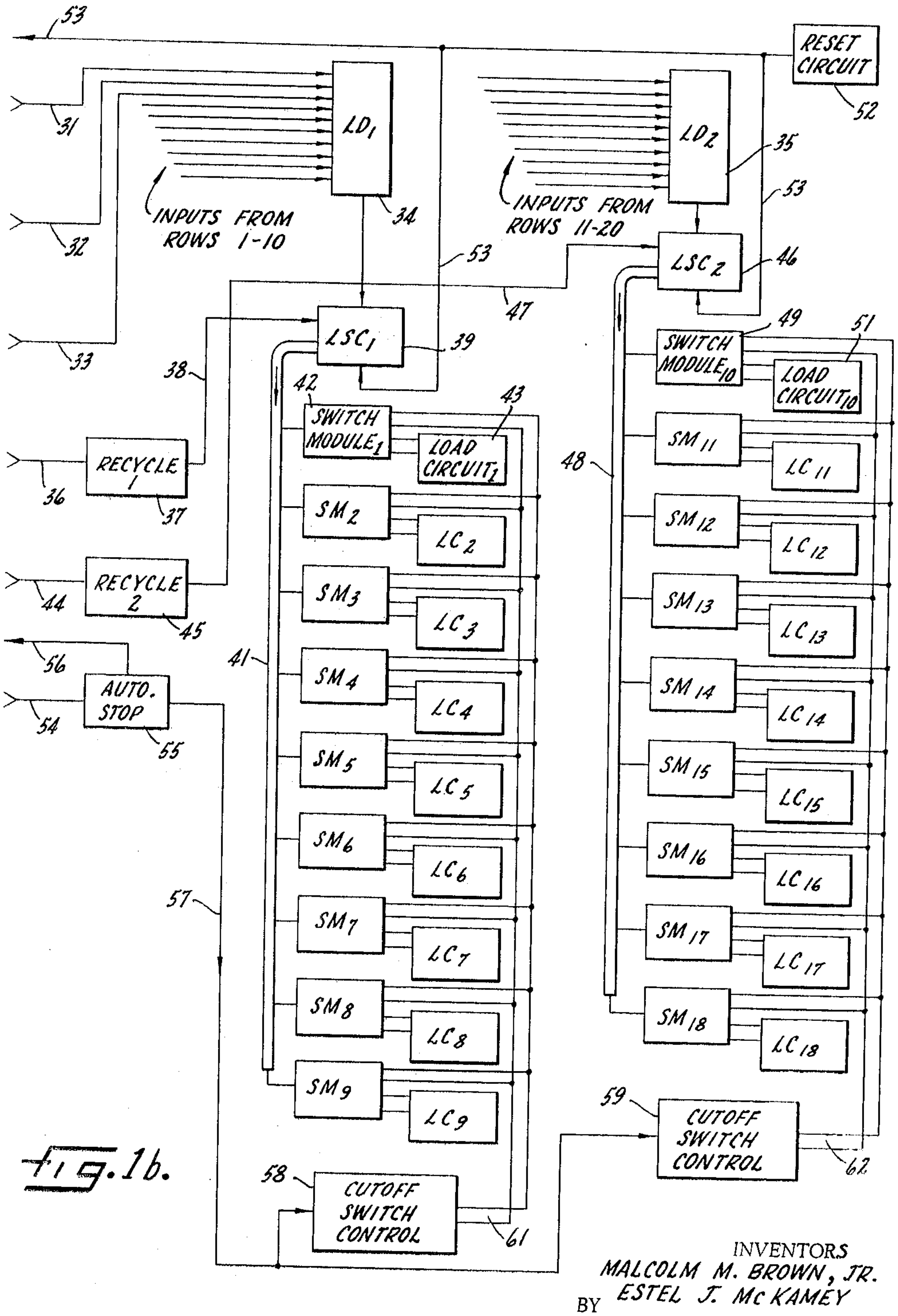
Figure 5:
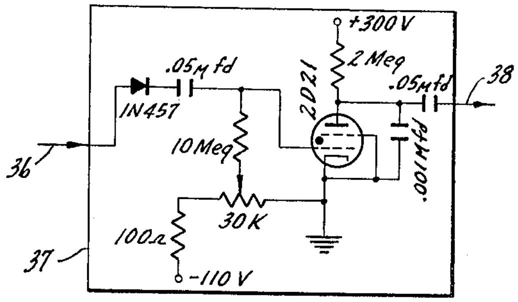

FIGURE 5 schematically depicts an embodiment of recycle circuitry suitable for use in blocks 37 and 45 of FIGURE 1*b*.

Figure 6:
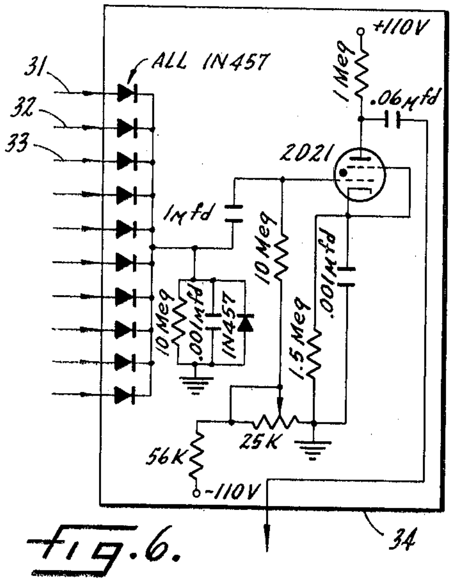

FIGURE 6 discloses logic-driver circuitry of the type suitable for employment in blocks 34 and 35 of FIGURE 1*b*.

Figure 7:
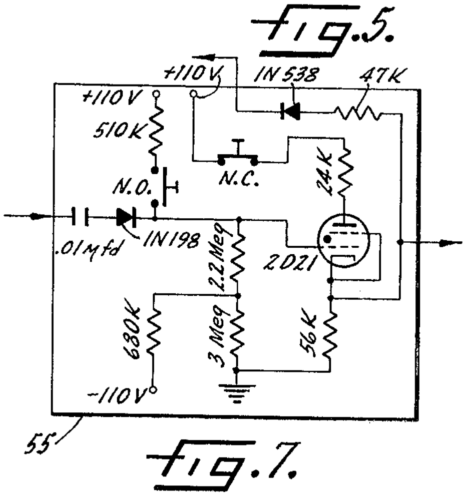

Shown in FIGURE 7 is a suitable embodiment of automatic stop circuitry for use in block 55 of FIGURE 1*b*.

Figure 8:
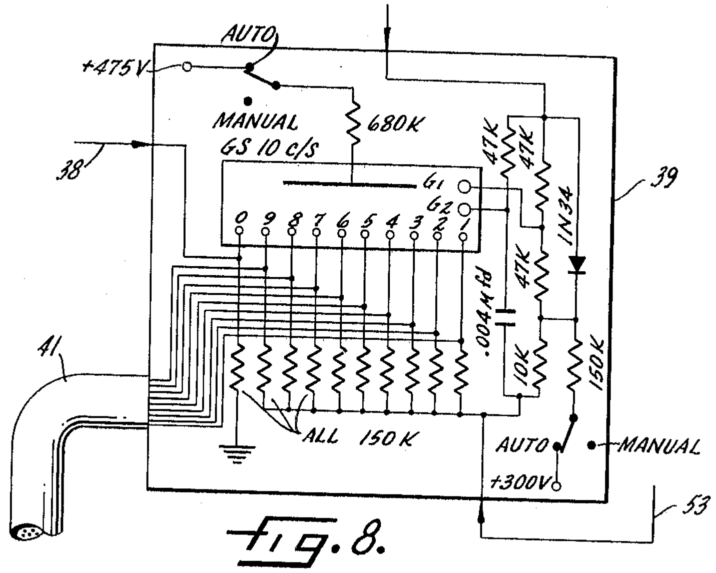

Disclosed in FIGURE 8 is a schematic diagram of circuitry containing a decade counting tube suitable for use as the load selecting circuitry of blocks 39 and 46 of FIGURE 1*b*.

Figure 9:
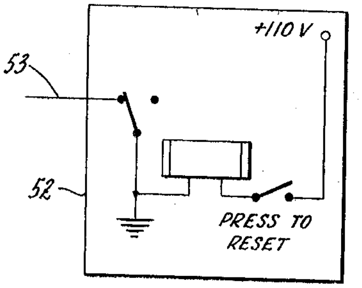

In FIGURE 9 is shown a suitable manual reset circuit for use in block 52 of FIGURE 1*b* to simultaneously reset all decade counting tubes in the invention.

Figure 10:
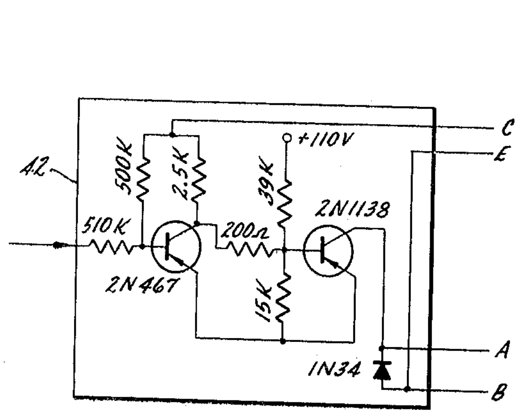

FIGURE 10 discloses suitable circuitry for use in blocks 42 and 49 to open and/or close an electrical path in load circuits 43 and 51 upon command from load selecting circuitry 39 and 46.

Figure 11:
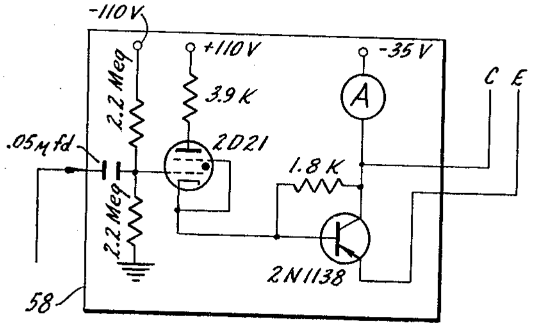

In FIGURE 11 is shown a suitable circuit for use in blocks 58 and 59 for preventing the functioning of the switching circuitry 42 and 49 upon command from the automatic stop circuitry 55.

Figure 12:
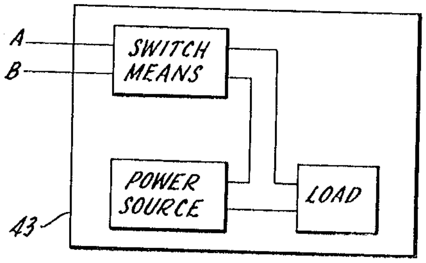

FIGURE 12 shows a block-schematic diagram of a load circuit which might be found in blocks 43 and 51 of FIGURE 1*b*.

Figures 2, 3:
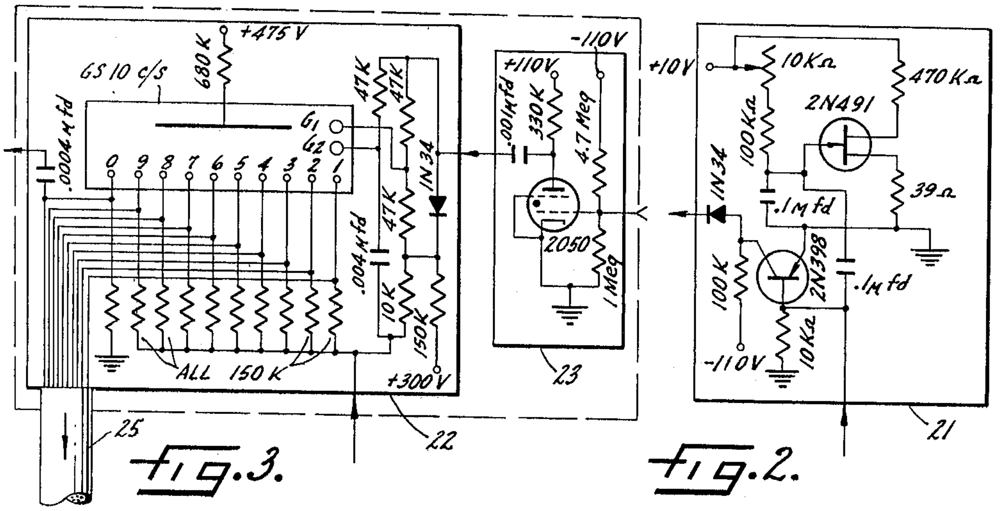
FIGURE 2 is a schematic diagram disclosing an embodiment of an oscillator-amplifier suitable for use in the present invention in block 21 of FIGURE 1*a*.
FIGURE 3 depicts an embodiment of a decade counting tube and its associated driver circuitry which may be utilized as blocks 22 and 23 respectively, of FIGURE 1*a*.

Referring now to the drawings, wherein like reference characters designate like or corresponding parts throughout the several views, there is shown in FIGURE 1*a* an oscillator-amplifier 21 which serves as the time generator for the invention, a suitable embodiment thereof being shown in FIGURE 2. This oscillator-amplifier supplies pulses at a desired frequency (preferably a multiple of 10) to the first time accumulation circuit 22 ($TAC_1$) coupled thereto, via its associated driver circuit 23. At a predetermined time $TAC_1$ will pulse $TAC_2$ via its associated driver, and this chain reaction will continue through the $TAC_n$ stage. Embodiments of suitable circuitry for performing the driving and time accumulation functions of blocks 23 and 22, respectively, of FIGURE 1*a* are shown in FIGURE 3. Blocks 24 in FIGURE 1*a* represent manually positionable programming switches (PS) and may be of the type shown in FIGURE 4 wherein all of those in a single column have like positions coupled to the same single conductor in ten-conductor cable 25, which conductor in turn is coupled to the corresponding cathode of the decade counting tube in the respective TAC circuit at the head of that particular column (for example, all twenty-three switches in Column 1 have their "6" positions coupled to a single conductor in cable 25 which in turn is coupled to the "6" cathode of the decade counting tube in $TAC_1$, so that a potential on this "6" cathode would be immediately conveyed to the "6" position of each of the twenty-three programming switches in Column 1). In any one of the rows of programming switches (Rows 1 through 23) diodes 26, of which a suitable type is shown in FIGURE 4, together with resistance 27 and positive potential source 28 form a logic "AND" circuit, the functioning of which will be explained in detail in a subsequent paragraph.

Conductors 31, 32, and 33 couple the AND circuits of programming switch rows 1, 2, and 3, respectively, to load selector logic-driver circuit 34 ($LD_1$), a suitable detailed embodiment thereof being shown in FIGURE 6. Identical rows 4 through 10 (not shown) are also coupled in a like manner to circuit 34, and rows 11 through 20 (also not shown) are coupled by like means to load selector logic-driver circuit 35 ($LD_2$), which may be identical to circuit 34. Conductor 36 couples row 21 to recycle$_1$ circuit 37, and in a like manner row 22 is coupled to recycle$_2$ circuit 45 via conductor 44 (for a detailed embodiment of identical circuits 37 and 45, see FIGURE 5). Recycle circuits 37 and 45 are coupled respectively to load selecting circuits 39 and 46 via conductors 38 and 47. Load selecting circuits 39 and 46, which may be of the type shown in FIGURE 8, are coupled via nine-conductor cables 41 and 48 to switch modules 42 (Nos. 1 through 9) and 49 (Nos. 10 through 18) respectively, all of which may be of the type shown in FIGURE 10. Each of switch modules 42 and 49 (Nos. 1 through 18) has a load circuit 43 or 51 of corresponding number (i.e., Nos. 1 through 18) coupled thereto, which may comprise any desired configuration wherein the function to be performed can be accomplished by the opening and/or closing of an electrical path for a preselected and programmed time interval. For example, such a load circuit might be of the type shown in FIGURE 12 wherein it is desired to close a circuit placing a source of power across a load for a specific time interval in accordance with certain test specifications, during which time the performance of either the power source or the load, or both, would be observed in relation to the test specifications.

A manual reset circuit for resetting all decade counting tubes to their initial "zero" counting positions is provided in block 52 of FIGURE 1*b*, a suitable embodiment thereof being disclosed in FIGURE 9. This reset circuit is coupled via conductors 53 to all time accumulation circuits ($TAC_1$ through $TAC_n$) and load selecting circuits 39 and 46 (LSC and $LSC_2$).

The output of programming switch row 23 is coupled via conductor 54 to automatic stop circuit 55, a suitable embodiment thereof being shown in FIGURE 7, which upon receipt of a stop signal via conductor 54, sends a signal via conductor 56 to stop oscillator-amplifier 21 and via conductor 57 to cutoff switch controls 58 and 59 (for a detailed embodiment thereof see FIGURE 11) which in turn send signals via conductors 61 and 62 to all switch modules 42 and 49 respectively, for appropriately controlling all load circuits 43 and 51.

It is to be understood that the exact values and specific types of components indicated in FIGURES 2 through 10 merely exemplify suitable values and types thereof for a single embodiment of the invention and that many modifications and substitutions may be made therein without departing from the spirit and scope of the invention.

TABLE I

| PS Row No. | Load Circuit | Desired "ON" Time (sec.) | Program Switch Settings for Columns 1–5 | | | | |
|---|---|---|---|---|---|---|---|
| | | | Column 5 | Column 4 | Column 3 | Column 2 | Column 1 |
| 1 | | | 0 | 0 | 0 | 0 | 0 |
| 2 | $LC_1$ | .03 | 0 | 0 | 0 | 0 | 3 |
| 3 | $LC_2$ | .12 | 0 | 0 | 0 | 1 | 5 |
| 4 | $LC_3$ | .02 | 0 | 0 | 0 | 1 | 7 |
| 5 | $LC_4$ | .19 | 0 | 0 | 0 | 3 | 6 |
| 6 | $LC_5$ | 1.20 | 0 | 0 | 1 | 5 | 6 |
| 7 | $LC_6$ | .73 | 0 | 0 | 2 | 2 | 9 |
| 8 | $LC_7$ | .86 | 0 | 0 | 3 | 1 | 5 |
| 9 | $LC_8$ | 3.26 | 0 | 0 | 6 | 4 | 1 |
| 10 | $LC_9$ | 27.38 | 0 | 3 | 3 | 7 | 9 |
| 11 | | | "OFF" | "OFF" | 0 | 0 | 0 |
| 12 | $LC_{10}$ | 3.27 | "OFF" | "OFF" | 3 | 2 | 7 |
| 13 | $LC_{11}$ | .46 | "OFF" | "OFF" | 3 | 7 | 3 |
| 14 | $LC_{12}$ | .09 | "OFF" | "OFF" | 3 | 8 | 2 |
| 15 | $LC_{13}$ | 1.08 | "OFF" | "OFF" | 4 | 9 | 0 |
| 16 | $LC_{14}$ | .64 | "OFF" | "OFF" | 5 | 5 | 4 |
| 17 | $LC_{15}$ | 2.37 | "OFF" | "OFF" | 7 | 9 | 1 |
| 18 | $LC_{16}$ | .38 | 0 | 0 | 8 | 2 | 9 |
| 19 | $LC_{17}$ | .21 | 0 | 0 | 8 | 5 | 0 |
| 20 | $LC_{18}$ | 24.06 | 0 | 3 | 2 | 5 | 6 |
| | Functional Instructions | | | | | | |
| 21 | No "Recycle" desired on Loads 1–9. | | "OFF" | "OFF" | "OFF" | "OFF" | "OFF" |
| 22 | Make one complete run through loads 10 to 18, then recycle continuously loads 10 through 15 until system is automatically stopped. | | "OFF" | 4 | 7 | 9 | 1 |
| 23 | Stop all circuitry at 57.91 seconds following tests initiation. | | 0 | 5 | 7 | 9 | 1 |

NOTE.—Settings established for a frequency of 100 cps. from oscillator 21.

*Operation*

For purposes of explanation of the operation of the invention, it will be assumed that a program of the type shown in Table I is to be performed and the following description of operation will relate thereto. While for this explanation it will be assumed that there are five columns of time accumulation and switching circuitry (i.e., Column N in FIG. 1*a*=Column 5), it is to be understood that more or less of these columns may be utilized without departing from the scope of the invention and the number (N) actually used will be determined by the maximum amount of time necessary to be accumulated for the performance of any single selection function in the particular application for which the equipment is to be constructed.

It will be further assumed that in FIG. 1*a* oscillator-amplifier 21 is operating at a frequency of 100 cycles per second and thereby providing 100 positive pulses every second to driver circuit 23 for the time accumulation circuit 22 ($TAC_1$) in Column 1. Each of these positive pulses from oscillator 21 causes the decade counting tube (an exemplary type may be the GS10C/S, Baird-Atomic Incorporated, Cambridge, Massachusetts, as shown in FIG. 3) in $TAC_1$ to step from the presently conducting cathode to that of the next higher number, thereby increasing any previous count contained therein by one, thus $TAC_1$ counts 100 equal intervals each second and may be said to operate at the fundamental frequency of oscillator 21. Therefore, when oscillator 21 operates at a frequency of 100 c.p.s., Column 1 may be referred to as the "hundredths" (.00 to .09) column since each count therein represents one hundredth of a second. Accordingly, at this frequency Column 2 is considered the "tenths" (.0 to .9) column since its time accumulation circuit $TAC_2$ receives one pulse to its associated driver circuit 22 from the zero cathode of the decade counting tube in $TAC_1$ every ten counts or once every complete cycle of $TAC_1$, thus $TAC_2$ increases its count by one every tenth of a second. In a like manner, Column 3 represents units, Column 4 represents tens, and Column 5 represents hundreds of seconds. It is to be understood that by varying the frequency of oscillator 21 by multiples of 10, the numerical significance of Column 1, and consequently Columns 2 through N, may be varied, i.e., by increasing the oscillator frequency to 10,000 c.p.s., Column 1 would represent a quantity of time from .0000 to .0009 second (tenths of a millisecond), Column 2 which receives and counts one pulse for every ten supplied to Column 1 would then represent thousandths (.000 to .009), Column 3 hundredths, Column 4 tenths, etc., and the operating frequency chosen for oscillator 21 should be determined by the smallest interval of time which a particular application necessitates the invention to count.

Referring now to Table I, the first column thereof indicates the program switch (PS) row numbers, the second column refers to the various load circuits ($LC_{1-18}$) by number and the third column indicates the amount of time in seconds or portions thereof that it is desired to place each respective load circuit in a closed or "on" position during this particular program. The remaining columns of Table I represent the individual program switch settings by column and row numbers for switches 24 shown in FIG. 1*a* in order to accomplish the desired functioning of the invention according to the exemplary program of Table I.

Assuming all program switches 24 in FIG. 1*a* have been set according to the instructions in Table I, all decade counting tubes in the time accumulation circuitry ($TAC_1$ through $TAC_N$) and the load selector circuitry ($LSC_1$ and $LSC_2$) have been preset to their zero cathodes by momentarily closing manual reset circuit 52 in FIG. 1*b*; and oscillator 21 has been constructed to produce a frequency of 100 c.p.s. (either by means of fixed valued components as shown in FIG. 2 if the invention is to be used exclusively for a program of the type in Table I which requires no time interval smaller than one hundredth of a second, or by means of a variable capacitance or inductance as is well known in the art if the invention is to be used for several programs some of which necessitate smaller intervals), the invention is ready to begin the program.

Upon initiation of power to the invention at a time $t_0$ at which instant the zero cathodes of all decade counting tubes are conducting, the switches 24 in all program switch rows 1 through 23 will have a positive potential (in excess of that supplied to positive terminals 28) present at their zero terminals due to this conduction existing between the zero cathode and the anode of each of the decade counting tubes in circuits $TAC_1$ through $TAC_5$ at the head of each column. These positive potentials present at all zero terminals of switches 24 serve to reverse bias and thereby cut off all diodes 26 whose associated program switches 24 have been manually set to zero. All such diodes thus biased "off" or nonconducting can no longer provide a path to ground (via switch 24, cable 25, TAC circuit 22, conductor 53, and reset circuit 52) for the positive potential 28 supplied to each row of switches 24. It can be seen (by viewing FIG. 4 in conjunction with FIGS. 1*a* and 1*b*) that any switch 24 having its movable selecting arm manually set to either the "OFF" position or to a position which is connected via a corresponding conductor in cable 25 to a presently conducting cathode of the same number in the TAC circuit at the head of its particular column will be unable to provide a path to ground for the respective positive potentials 28 presented to each row. Thus at any single instant in which *all* switches 24 in any row become "open" such that at least one path to ground for potential 28 in that row no longer exists, the potential on the output conductor for that row (for example, conductor 31 for row 1, conductor 44 for row 22, etc.) suddenly rises. This pulse or sudden rise in potential may be considered to be the output of an AND circuit, since it will be obtained from any particular row only at the instant when the time accumulated in TAC circuits 1 through 5 is exactly equal to the settings on switches 24 in that particular row. At time $t_0$ when the zero cathodes of all decade counting tubes in the invention are conducting, it can be seen from Table I in view of the above discussion that row 1 having its switches 24 set 0–0–0–0–0 and row 11 having its switches 24 set to OFF–OFF–0–0–0 will function as AND circuits to which all necessary inputs have been applied and the potential present on the output conductors of each of these rows 1 and 11 will therefore rise suddenly (since at the instant preceding, a path to ground could be traced for this potential 28 through at least one diode 26 and associated switch 24 in each of these two rows). This pulse or rise in potential on conductor 31 for row 1 is conveyed thereby to the input of logic-driver 34 ($LD_1$) of FIG. 1*b* shown in detail in FIG. 6. This positive pulse passes via the diode "OR" gate and capacitor to the grid of the thyratron driving tube in logic-driver 34 pulsing the thyratron and causing a sharp drop or negative going pulse to be generated on the anode of the driving tube which is conveyed via the output conductor of logic-driver 34 to load selecting circuit 39 ($LSC_1$) shown in detail in FIG. 8. This negative going pulse supplied to circuit 39 is effective to cause the decade counting tube therein to step from its previously conducting zero cathode to its one cathode thereby causing a positive potential to be presented via the one conductor in nine-conductor cable 41 to switch module $SM_1$ shown in detail in FIG. 10, which then closes the load circuit via a suitable switch means in load circuit $LC_1$ shown in block form in FIG. 12, placing the load therein across a power source for reliability testing of either the load or the power source or both. The switch means shown in block form in FIG. 12 may be omitted if the current in the load circuit of block 43 is not in excess of the rated current of the output transistor of block 42 shown in FIG. 10, since this transistor could then be used directly as the switching means; however, if the load current is excessive then the switch means could comprise a relay having its energizing coil coupled between conductors A and B of FIG. 12. In a like manner and simultaneously therewith, the positive pulse or sudden rise in potential on the output conductor of row 11 (not shown) at time $t_0$ is conveyed thereby to logic-driver 35 ($LD_2$) of FIG. 1*b*, via its OR gate input, which in turn sends a negative pulse via its output conductor to load selecting circuit 46 ($LSC_2$) causing the decade counting tube therein to step from its initially conducting zero cathode to its one cathode, causing a positive potential to be presented via the one conductor in nine-conductor cable 48 to switch module $SM_{10}$ causing it to "close" the circuit in load circuit $LC_{10}$ placing the load therein across its associated power source. Thus, it has been shown that at time $t_0$ when TAC circuits 1 through 5 contain a count of 0–0–0–

0–0 and the program switches 24 are manually set to the positions indicated in Table I, rows 1 and 11 will have all paths to ground for their respective potentials 28 "opened" causing load selecting circuits 39 and 46 respectively, to place load circuits 1 and 10 in a "closed" condition for testing purposes.

At time $t_0$+.01 second, oscillator 21 will pulse $TAC_1$ driver 23 which in turn will cause the decade counting tube in $TAC_1$ to step from its zero cathode to its one cathode; at $t_0$+.02 second another pulse from oscillator 21 (operating at 100 c.p.s.) will cause $TAC_1$ to step to its "two" cathode, etc., until at $t_0$+.10 second $TAC_1$ steps back to its zero cathode which also sends a pulse to $TAC_2$ driver 23 causing $TAC_2$ to step from its zero cathode to its one cathode, thus it may be seen that at a time $t_0$+.10 sec. the counting tubes in TAC circuits 5 through 1 would have the following cathodes conducting, 0–0–0–1–0. The TAC circuits will continue to accumulate time with each pulse of oscillator 21.

As seen from the third column of Table I it is desired that load circuit ($LC_1$) remain closed or on for .03 second, and the switches 24 in row 2 have accordingly been positioned to accomplish the opening of circuit ($LC_1$) at time $t_0$+.03 sec. and to close load circuit $LC_2$ at that same instant, since all switches 24 in row 2 are set at the zero position except the switch in Column 1 which is set at the three position. Thus when the time accumulated by TAC circuits 1 through 5 equals .03 second (i.e., TAC circuits 2 through 5 have their zero cathodes conducting and $TAC_1$ has its three cathode conducting), all paths to ground for potential 28 in row 2 will be cut off since all diodes 26 therein will be reverse biased by the positive potentials present at their cathodes due to this conduction. Thus at time $t_0$+.03 second, load circuit $LC_1$ will have been closed the desired .03 second and row 2 will provide a positive pulse via conductor 32 to logic-driver circuit 34 ($LD_1$) which in the manner previously described will cause the decade counting tube in load selecting circuit 39 ($LSC_1$) to step from its previously conducting one cathode to the two cathode which extinguishes the positive potential supplied to switch module $SM_1$ thereby cutting it off and opening load circuit $LC_1$, and places a positive potential on conductor 2 in nine-conductor cable 41 which biases switch module $SM_2$ on thereby closing the load circuit $LC_2$ which, according to Table I, must remain closed for .12 second. In a like manner the invention will proceed to follow the program of Table I, i.e., at time $t_0$+.15 second, row 3 will cause $LSC_1$ to step from its two cathode to its three cathode thereby opening $LC_2$ and closing $LC_3$, etc., until at time $t_0$+33.79 seconds, row 10 will cause $LSC_1$ to step from its "nine" cathode conducting at that time, back to its zero cathode, signifying completion of the desired program for load circuits $LC_1$ through $LC_9$ thereby leaving them in an open state. The Functional Instruction section of Table I indicates that no repeating or "recycling" of loads 1 through 9 is desired; therefore, row 21 in FIG. 1*a* which is the recycle control row for load selecting circuit 39 ($LSC_1$), and thereby for load circuits $LC_1$ through $LC_9$, has all of its program switches 24 set to the OFF position thus preventing any pulse or sudden rise in potential on conductor 36 during the performance of this program.

As previously described, the setting of program switches 24 in row 11 caused load circuit $LC_{10}$ to be placed in an on or closed condition at time $t_0$ and Table I indicates that it is to remain in this condition for 3.27 seconds. Thus at time $t_0$+3.27 seconds the AND circuit formed in row 12, in the manner previously described for rows 1 and 11, will cause load selecting circuit 46 ($LSC_2$) to step from its previously conducting one cathode to the two cathode thereby opening the load circuit $LC_{10}$ after its desired on time of 3.27 seconds and closing the load circuit $LS_{11}$ which according to Table I is to remain closed for .46 second. The invention will continue to follow the program, as previously explained for loads $LC_1$ through $LC_9$, until at time $t_0$+32.56 seconds row 20 will cause load circuit $LC_{18}$ which has previously been on or closed for the desired 24.06 second interval, to be opened as the decade counting tube in load selecting circuit 46 steps from its nine cathode (which is coupled via cable 48 to switch module $SM_{18}$) to its zero cathode. All load circuits $LC_{10}$ through $LC_{18}$ are now in an off or open position indicating the completion of first cycle of operation for these loads. The Functional Instructions section of Table I indicates that loads $LC_{10}$ through $LC_{15}$ are to be continuously recycled until the system is automatically stopped by the stop circuitry controlled by the settings in row 23 at time $t_0$+57.91 seconds. Having completed the first cycle, load circuit $LC_{10}$ through $LC_{18}$ will remain open until time $t_0$+40.00 seconds, when row 11 will provide a positive pulse to logic-driver circuit 35 which in turn will provide a negative pulse to load selecting circuit 46 causing it to step from its zero cathode to its one cathode which causes switch module $SM_{10}$ to again close the load circuit $LC_{10}$, beginning a second series of tests on load circuits $LC_{10}$ through $LC_{15}$; at time $t_0$+43.27 seconds row 12 will cause $LC_{10}$ to be opened and $LC_{11}$ to be closed, etc., until at time $t_0$+47.91 seconds, recycle row 22 will provide a positive pulse via its output conductor 44 to recycle circuit 45 shown in detail in FIG. 5 which in turn provides a negative pulse via conductor 47 directly to the zero cathode of the decade counting tube in load selecting circuit 46 (shown in detail in FIG. 8 or $LSC_1$ conductor 38 therein corresponding to conductor 47) causing the conduction therein to skip from the "six" cathode then conducting to the more negative zero cathode thereby opening load circuit $LC_{15}$ and placing $LSC_2$ in condition to begin the third cycle of load circuits $LC_{10}$ through $LC_{15}$. This third cycle begins at time $t_0$+50.00 seconds when row 11 causes $LSC_2$ to again step from its zero cathode to its one cathode causing switch module $SM_{10}$ to again close load circuit $LC_{10}$, etc., until at time $t_0$+57.91 seconds, row 23 sends a positive pulse to automatic stop circuit 55 (shown in detail in FIG. 7). This circuit in turn places a positive potential on conductor 56 which is conveyed thereby to oscillator-amplifier 21 (see FIG. 2) where it serves to bias off that circuit thereby causing the TAC circuits to stop accumulating time, and on conductor 57 which is conveyed to cutoff switch control circuits 58 and 59 (for detail see FIG. 11) which in response thereto cause switch modules $SM_1$ through $SM_9$ and $SM_{10}$ through $SM_{18}$ respectively, to open all load circuits $LC_1$ through $LC_{18}$ not already open. Thus the invention has, at time $t_0$+57.91 seconds completed the program established for it as set forth in Table I and will remain in this state of suspended activity until the automatic stop circuitry 55 is disengaged (by momentarily opening the normally closed switch in the anode circuit thereof) at which time oscillator-amplifier 21 will again provide pulses to the time accumulation circuitry, and by momentarily closing the switch in manual reset circuit 52 all decade counting tubes in the invention will be reset to their zero cathodes, placing the invention in condition to repeat the program of Table I or any other similar program of function selecting activities.

Thus it becomes apparent from the foregoing description and annexed figures of drawing that the invention, a versatile, completely electronic, programmable function selecting system, is a useful and practical device having a wide variety of applications in fields such as electronics equipment testing and programmed function selecting. The usefulness of the device is enhanced by its reliability and long service-free life expectancy resulting from the novel utilization of completely electronic time accumulation and load selecting circuits.

Obviously many modifications and variations of the present invention are possible in the light of the above teachings. It is therefore to be understood, that within the scope of the appended claims the invention may be practiced otherwise than as specifically described.

We claim:

1. A completely electronic programmable function selecting system comprising:

adjustable solid state time signal generation means for producing and amplifying repetitive signal pulses, each pulse being indicative of the passage of a predetermined time interval;

a plurality of electronic time accumulation and indication circuits coupled to produce a sequence of operation increasing from the first to the last, each circuit having a plurality of outputs with the input of the first circuit coupled to said time signal generator to accumulate time by producing electrical indications sequentially on said plurality of outputs of each time accumulation circuit;

a plurality of program control means for each time accumulation means, each program control means having a plurality of inputs coupling correspondingly the outputs of the related time accumulation circuit and each having means setable to produce continuity with one of said inputs on an output thereof to conduct said electrical indications;

electronic logic circuitry having input means coupled to the outputs of all but at least two of the last of said plurality of program control means for receiving said electrical indications, and having output means for providing signal pulses thereon in time coincidence with said electrical indications;

electronic load selection and actuation means having a decade counting tube with the grid thereof coupled to the output means of said logic circuitry for receiving said signal pulses to pulse the plurality of cathodes thereof in sequence, each cathode output of said decade counting tube being coupled to actuate a load circuit in accordance with said signal pulses;

programmable electronic recycling circuitry having input means coupled to said output of at least one but not the last of said program control means, and having output means coupled the first cathode of said decade counting tube in to said load selection and actuation means to cause said load selection and actuation means to recycle said load circuitry coupled thereto in accordance with a prearranged program of continuity between said inputs and setable means in the associated program control means;

and programmable electronic stop circuitry having input means coupled to said outputs of the last of said program control means and having output means coupled to said load selection and actuation means and to said time signal generation means to place said programmable function selecting system in a state of suspended activity in accordance with a prearranged program of continuity between said inputs and setable means in the last of said plurality of program control means.

2. A completely electronic programmable function selecting system in accordance with claim 1 wherein said time signal generation means comprises an oscillator-amplifier circuit having means for selectively establishing the output frequency of said repetitive signal pulses.

3. A completely electronic programmable function selecting system in accordance with claim 2 wherein said time accumulation and indication means comprises electronic decade counting circuitry and thyratron driving circuitry therefor in which said plurality of outputs are from the cathodes of said decade counting circuitry.

4. A completely electronic programmable function selecting system in accordance with claim 3 wherein said program control means comprises a plurality of multiposition manually adjustable switch means.

5. A completely electronic programmable function selecting system in accordance with claim 4 wherein said logic circuitry comprises a plurality of logical AND circuit means in the input means.

References Cited by the Examiner

UNITED STATES PATENTS

| | | | |
|---|---|---|---|
| 2,712,414 | 7/1955 | Ziebolz et al. | 34—172.5 |
| 2,975,338 | 3/1961 | Bivens et al. | 235—132 |
| 3,122,722 | 2/1964 | Subry et al. | 340—172.5 |

OTHER REFERENCES

Tooke, counting Circuit Batches Components, Electronics, February 1955, pp. 157–159.

Churchill and Evans, A Scaler for the Measurement of Half Lives, Electronic Engineering, February, 1955, pp. 74–77.

ROBERT C. BAILEY, *Primary Examiner.*

MALCOLM A. MORRISON, *Examiner.*

W. M. BECKER, R. M. RICKERT, *Assistant Examiners.*